United States Patent Office 3,372,204
Patented Mar. 5, 1968

3,372,204
PROCESS FOR PREPARATION OF 1-PHENYL-HEPTAFLUOROCYCLOPENTENE
Maurice Stacey, Robert Stephens and John Colin Tatlow, Edgbaston, Birmingham, England, assignors to Hooker Chemical Corporation, Niagara Falls, N.Y., a corporation of New York
No Drawing. Filed May 5, 1966, Ser. No. 547,775
4 Claims. (Cl. 260—650)

This invention relates to a process for the preparation of 1-phenylheptafluorocyclopentene by the condensation of a perfluorinated bromocycloolefin.

It is an object of the present invention to provide a simple and direct process for the preparation of 1-phenyl-heptafluorocyclopentene.

Another object of the present invention is to provide a process for the preparation of 1-phenylheptafluorocyclopentene in relatively high purity and in good yield.

These and other objects will become apparent from a reading hereinafter.

In accordance with the present invention, there is provided a process for the preparation of 1-phenylheptafluorocyclopentene by reacting a perfluorinated 1-bromocycloolefin with copper bronze and bromobenzene at elevated temperatures.

The main reaction occurring is illustrated by the following equation which is not intended to be limiting:

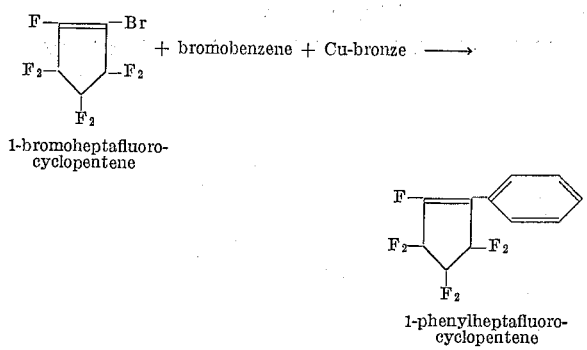

The 1-bromoheptafluorocyclopentene was prepared by the addition of bromine to 1H-nonafluorocyclopentene under ultraviolet irradiation, followed by dehydrobromination of the crude dibromide with aqueous alkali.

The copper bronze is mainly a copper base alloy, which is a commercial pulverized form of copper, such as is used in the Ullman reaction was prepared by a hydrogen reduction procedure and was purchased from British Drug Houses, Ltd., in London.

The reaction is accomplished at elevated temperatures in the range of about 200 degrees centigrade to about 300 degrees centigrade with the preferred temperature being about 230 degrees centigrade to about 250 degrees centigrade.

With respect to the molar ratios of reactants, the amounts employed can be varied over wide ranges. Generally, an excess of copper bronze is used. Normally, about 6 moles of copper bronze to 1.2 moles of bromobenzene and 1 mole of bromocycloolefin are used. Greater and lesser amounts can be employed such as 5 to 10 moles of copper bronze, to 0.5 to 3 moles of bromobenzene and 0.5 to 3 moles of bromocycloolefin, but the yield and purity of product can be adversely affected under such conditions. It is, of course, to be appreciated that, other suitable molar ratios of reactants can be used, however, in such instances, the reaction mechanism may be adversely affected, resulting in a mixture of products.

The desired product can be isolated from the reaction medium by known methods, e.g., distillation, preparative gas chromatography. However, in the practice of the present invention, preparative gas chromatography was employed. Other products formed during the reaction include 1H - heptafluorocyclopentene, perfluorobicyclopent-1,1'-enyl, benzene and diphenyl.

The 1-phenylheptafluorocyclopentene was characterized by elemental analysis, infrared and ultraviolet spectroscopy and by its ready oxidation to 5 - phenyl - 5 - keto-2,2,3,3,4,4-hexafluoro-n-valeric acid with potassium permanganate in acetone.

The compound of this invention is useful as an intermediate for the praparation of polymers, as a fire retardant additive and as a pesticide.

As a fire retardant additive, the compound of this invention can be incorporated into polymeric materials, that is, polyesters and polycarbonates, in an amount of from about 2 to about 50 percent by weight of the polymeric composition and desirably from about 10 to about 40 percent by weight of the polymeric composition are admixed with the polymeric composition. Improved fire retardance can also be provided by incorporating into the polymer metallic compounds wherein the metal is antimony, arsenic, or bismuth in amounts of from 1 to about 30 percent by weight. For the preparation of polymers, the compound of this invention can be reacted with an unsaturated carboxylic compound, like maleic anhydride, in a Diels-Alder reaction, followed by subsequent reaction with a glycol and more unsaturated carboxylic compound. The resulting polyester can be copolymerized with vinyl monomers, such as styrene, to yield products which are useful as laminating agents and castings.

The following examples are presented to further illustrate the invention but is not intended to limit its scope. Unless specified otherwise, all temperatures are in degrees centigrade and all parts are by weight.

EXAMPLE 1.—REACTION OF 1-BROMOHEPTAFLUOROCYCLOPENTENE WITH BROMOBENZENE IN THE PRESENCE OF COPPER BRONZE 1-bromoheptafluorocyclopentene (2.2 grams), bromobenzene (2.2 grams) and a commercial form of pulverized copper bronze (4 grams) were sealed in a hard glass tube and heated in a Carius furnace at 245 to 250 degrees centigrade for 63 hours. The volatile products (2.6 grams) were distilled in vacuo from the copper bronze and separated by preparative gas chromatogarphy to yield (1) 1H-heptafluorocyclopentene (0.05 gram); (2) perfluorodicyclopent-1,1'-enyl (0.2 gram); (3) benzene (0.1 gram); (4) bromobenzene (0.05 part); (5) 1-phenylheptafluorocyclopentene (1.33 grams) with an infrared spectrum identical to that of the product of the reaction of octafluorocyclopentene with phenyl lithium, and (6) diphenyl (0.13 gram). By infrared spectroscopy, the peaks for (2) showed no trace of 1-bromoheptafluorocyclopentene, and the spectrum was correct for perfluorodicyclopent-1,1'-enyl, and 1-phenylheptafluorocyclopentene.

EXAMPLE 2.—1-PHENYL HEPTAFLUOROCYCLOPENTENE (a) From octafluorocyclopentene and phenyl lithium A solution of phenyl lithium in ether (60 milliliters; 0.078 gram of phenyl lithium per milliliter of ether) was slowly added to octafluorocyclopentene, 16.1 grams at −65 degrees centigrade, in an atmosphere of dry nitrogen and the mixture allowed to warm to 15 degrees centigrade. It was then stirred for 16 hours and 1 normal $H_2SO_4$ was added. The ether solution and the ether extract of the aqueous phase were combined, dried over MgSO$_4$, filtered and distilled to give (1) octafluorocyclopentene (4.9 grams), (boiling point 25 degrees centigrade); (2) ether; (3) higher boiling liquids (4.0 grams); (4) a solid which was recrystallized from petrol (boiling point 60 to 80 degrees centigrade) to give 1,2-diphenylhexafluorocyclopentene (0.6 gram), melting point 76–77 degrees centigrade. (Found: C—62.4%; H—3.1%. C$_{17}$H$_{10}$F$_6$ requires C—62.2%; H—3.1%).

Fraction (3) was separated by gas chromatography to give: (1) ether and octafluorocyclopentene (0.5 gram); (2) bromobenzene (0.4 gram); both with correct infrared spectra; (3) 1-phenylheptafluorocyclopentene (2.5 grams), (boiling point 176–177 degrees centigrade). (Found: C—48.9%; H—1.9%. C$_{11}$H$_5$F$_6$ requires C—48.9%; H—1.9%.) This olefin (2.9 grams) and potassium permanganate (2.3 grams) in acetone (24 milliliters) gave the crystalline 5-phenyl-5-keto-2,2,3,3,4,4-hexafluoro-n-valeric acid (1.5 grams).

The infrared spectrum of 1-phenylheptafluorocyclopentene showed weak absorption at 6 and 6.65 microns, indicating the presence of C=C and a phenyl group. Also strong bands at 8.7 and 9.5 microns illustrate the presence of C—F, while a medium band at 13 microns indicated monosubstitution of the phenyl group.

While there have been described various embodiments of the invention, the compositions and methods described are not intended to be understood as limiting the scope of the invention as it is realized that changes therewithin are possible, and it is further intended that each element recited in any of the following claims is intended to be understood as referring to all equivalent elements for accomplishing substantially the same results in substantially the same or equivalent manner, it being intended to cover the invention broadly in whatever form its principles may be utilized.

What is claimed is:
1. A process for the preparation of 1-phenylheptafluorocyclopentene which comprises reacting 0.5 to 3 moles of 1-bromoheptafluorocyclopentene with 0.5 to 3 moles of bromobenzene and 5 to 10 moles of copper bronze at an elevated temperature in the range of about 200 degrees centigrade to about 300 degrees centigrade.
2. A process according to claim 1 wherein the product 1-phenylheptafluorocyclopentene is separted from the reaction mix and is recovered.
3. A process in accordance with claim 2 wherein the elevated temperature is from about 230 degrees centigrade to about 250 degrees centigrade.
4. A process in accordance with claim 2 wherein the reactants are about 6 moles of copper bronze, 1.2 moles of bromobenzene and 1 mole of 1-bromo-heptafluorocyclopentene.

References Cited

UNITED STATES PATENTS

| | | | |
|---|---|---|---|
| 2,496,067 | 1/1950 | Rosenthal | 260—649 X |
| 3,046,313 | 7/1962 | Pummer et al. | 260—649 X |

OTHER REFERENCES

Houben, Die Methoden der Organischen Chemie, vol. 2, 1943, pp. 789–791, Edward Brothers, Ann Arbor, Mich., 1925.

Fanta, Chemical Reviews, vol. 38, pp. 141, 142, 147, 148, 1946.

Fieser et al., Organic Chemistry, D. C. Heath, New York, 1944, p. 662.

Wagner et al., Synthetic Organic Chemistry, J. Wiley and Sons, New York, 1953, p. 12.

LEON ZITVER, *Primary Examiner.*

H. T. MARS, N. J. KING, JR., *Assistant Examiners.*